(12) United States Patent
Qiu et al.

(10) Patent No.: US 8,520,239 B2
(45) Date of Patent: Aug. 27, 2013

(54) PRINTING CONTROL METHOD AND APPARATUS OF A PRINTING PROCESS WITH DIFFERENT WORKING STAGES

(75) Inventors: Haibo Qiu, Weihai (CN); Ming Gao, Weihai (CN); Jiabo Xu, Weihai (CN); Wei Liu, Weihai (CN); Yuanbin Peng, Weihai (CN)

(73) Assignee: Shandong New Beiyang Information Technology Co., Ltd., Weihai, Shandong (CN)

( * ) Notice: Subject to any disclaimer, the term of this patent is extended or adjusted under 35 U.S.C. 154(b) by 384 days.

(21) Appl. No.: 12/676,127

(22) PCT Filed: Dec. 21, 2007

(86) PCT No.: PCT/CN2007/071295
§ 371 (c)(1),
(2), (4) Date: Mar. 2, 2010

(87) PCT Pub. No.: WO2009/030097
PCT Pub. Date: Mar. 12, 2009

(65) Prior Publication Data
US 2010/0182641 A1  Jul. 22, 2010

(30) Foreign Application Priority Data
Sep. 5, 2007 (CN) .......................... 2007 1 0145799

(51) Int. Cl.
*G06F 3/12* (2006.01)
(52) U.S. Cl.
USPC ...................... 358/1.15; 358/1.14; 358/1.16
(58) Field of Classification Search
USPC ............................ 358/1.14–1.16
See application file for complete search history.

(56) References Cited

U.S. PATENT DOCUMENTS 5,179,410 A * 1/1993 Farrell et al. ............... 399/9
5,580,177 A * 12/1996 Gase et al. ............... 400/61
5,799,206 A  8/1998 Kitagawa et al.
(Continued)

FOREIGN PATENT DOCUMENTS

| CN | 1439946 A | 9/2003 |
| CN | 1668472 A | 9/2005 |
| CN | 1733482 A | 2/2006 |
| EP | 1152325 A1 | 11/2001 |

OTHER PUBLICATIONS

International Search Report mailed May 15, 2008; International Application No. PCT/CN2007/071295, 6 pages.

(Continued)

*Primary Examiner* — Benny Q Tieu
*Assistant Examiner* — Quyen V Ngo
(74) *Attorney, Agent, or Firm* — Kilpatrick Townsend & Stockton LLP

(57) ABSTRACT

A printing control method includes the following steps: dividing the printing process of the printer into different working processes, obtaining the state information of the printer of different working processes in real time, and controlling the corresponding printing process on the basis of the obtained state information of the printer of different working processes. In addition, a printing control apparatus includes the following units: a unit for dividing the process, a unit for obtaining the state of the printer and a unit is for controlling printing process. The invention can make sure that every par data needed to be printed could be fully printed on the surface in order to realize the printing of the effective par data.

11 Claims, 3 Drawing Sheets

(56) References Cited

U.S. PATENT DOCUMENTS

| | | |
|---|---|---|
| 6,347,203 B1* | 2/2002 | Kutsuwada .................. 399/82 |
| 6,697,678 B2* | 2/2004 | Miyasaka et al. ............... 700/9 |
| 6,851,781 B2 | 2/2005 | Yokoyama |
| 7,061,639 B2* | 6/2006 | McGuire et al. ............ 358/1.16 |
| 2002/0140962 A1 | 10/2002 | Oka et al. |
| 2004/0036908 A1* | 2/2004 | Yagita et al. ............... 358/1.15 |
| 2004/0059995 A1* | 3/2004 | Takabayashi et al. ........ 715/500 |
| 2004/0179230 A1* | 9/2004 | Kitada et al. .............. 358/1.15 |
| 2005/0068547 A1* | 3/2005 | Negishi et al. ............... 358/1.1 |
| 2006/0092461 A1 | 5/2006 | Kitada et al. |
| 2006/0152759 A1* | 7/2006 | Chen et al. ................ 358/1.15 |
| 2006/0221392 A1* | 10/2006 | Wanda ..................... 358/1.15 |
| 2006/0227363 A1 | 10/2006 | Ogura et al. |
| 2006/0279757 A1 | 12/2006 | Fukano et al. |
| 2007/0236723 A1* | 10/2007 | Gaertner et al. ............ 358/1.15 |

OTHER PUBLICATIONS

EP Application No. 07846121.7, European Search Report dated Oct. 10, 2011, 7 pages.

* cited by examiner

| Byte 1 | Bit 1 | Bit 2 | Bit 3 | Bit 4 | Bit 5 | Bit 6 | Bit 7 | Bit 8 |

| Byte 2 | Bit 1 | Bit 2 | Bit 3 | Bit 4 | Bit 5 | Bit 6 | Bit 7 | Bit 8 |

| Byte 3 | Bit 1 | Bit 2 | Bit 3 | Bit 4 | Bit 5 | Bit 6 | Bit 7 | Bit 8 |

PRINTING CONTROL METHOD AND APPARATUS OF A PRINTING PROCESS WITH DIFFERENT WORKING STAGES

The application claims a priority to Chinese Patent Application No. 200710145799.3, entitled "a Printing control method and apparatus" and filed with the Chinese Patent Office on Sep. 5, 2007, which is hereby incorporated by reference in its entirety.

FIELD OF THE INVENTION

The present invention relates to the field of the printing technology, and in particular to a printing control method and apparatus.

BACKGROUND OF THE INVENTION

In recent years, more and more ticket printing applications arose, such as lottery ticket printing, which generally requires a complete ticket content to meet the need for using the ticket.

In the prior art, upper machine control software for controlling the printer is unable to know whether the printing of the ticket data is complete, and it considers the printing of the ticket to be successful upon distributing ticket data to be printed to the printer. Therefore, even if in the case that the ticket is invalid due to the incomplete printing of the ticket, the upper machine control software still considers that a valid ticket is printed and the ticket number is registered in the software system of the upper machine. For example, in the process of printing the ticket, if the data of the present ticket is lost and the printing of the ticket content is incomplete due to uplifting of the upper lid of the printer, disturbance to the data communication, use out of the printing ticket paper which requires an exchange of the paper reel, etc., the upper machine control software still considers that a complete and valid ticket is printed.

However, there is no printing control method which can judge the completeness (the validity) of the ticket printing, therefore if there is an error in the printer, which leads to that the ticket data to be printed is not completely and precisely printed on the par. The ticket purchased by the user might not meet the use criteria of the ticket due to the incompleteness of the bar code, key code and the amount, causing the ticket to be unusable, which seriously endangers the property benefit of the ticket user, and causes the unnecessary dispute between the ticket user and the ticket distributor.

SUMMARY OF THE INVENTION

In view of this, an object of embodiments of the invention is to provide a printing control method and apparatus, which can ensure that each ticket data needing to be printed is completely printed on the par, thereby realizing the effective printing of the ticket data.

According to the invention, a printing control method includes:
dividing a printing process of a printer into different working stages;
acquiring printer state information of the different working stages in real time;
performing a corresponding printing process control according to the acquired printer state information of the different working stages.

Preferably, performing the corresponding printing process control includes:
performing a first predetermined operation according to the acquired printer state information before sending printing data;
performing a second predetermined operation according to the acquired printer state information after the printer receives a printing task;
performing a third predetermined operation according to the acquired printer state information after the printer enters into the printing process.

Preferably, the first predetermined operation specifically includes:
if the printer is in a Normal Printing Allowed state, distributing the printing task;
and if the acquired printer state information indicates that there is an error in the printer, distributing the printing task after a recovery of the error.

Preferably, the second predetermined specifically includes:
if the printer is in a Normal Printing Not Entered state, the printer continuing waiting to enter into the printing process;
if the printer is in a Printing Entered state, processing the printing task;
and if the printer is in a Printing Forbidden state at present, resending currently printed ticket data and/or registering the currently printed ticket as an invalid ticket.

Preferably, the third predetermined operation specifically includes:
if the printer state information indicates that there is no error in the printer during the printing process, finishing the printing;
and if it indicates that there is an error in the printer during the printing process according to the printer state information, clearing a printing buffer and setting a Printing Forbidden bit and a Printing Abnormally Completed bit of a printer real-time state flag byte.

Preferably, the method further includes: if it indicates that there is an error in the printer during the printing process according to the printer state information, registering the currently printed ticket as an invalid ticket.

Preferably, the method further includes receiving a cutter instruction and finishing the printing task.

Preferably, when the acquired printer state information indicates that the printer is in a Printing Normally Completed state, the printed ticket is complete and valid.

The invention further provides a printing control apparatus, which includes a stage dividing unit, a printer state acquiring unit and a printing process control unit, wherein,
the stage dividing unit is adapted to divide a printing process of a printer into different working stages;
the printer state acquiring unit is adapted to acquire the printer state information of the different working stages in real time;
the printing process control unit is adapted to perform a corresponding printing process control according to the printer state information of the different working stages acquired by the printer state acquiring unit.

Preferably, the printing process control unit includes:
a first predetermined operation execution unit, adapted to perform a first predetermined operation according to the acquired printer state information before sending the printing data;
a second predetermined operation execution unit, adapted to perform a second predetermined operation according to the acquired printer state information, after the printer receives the printing task;

a third predetermined operation execution unit, adapted to perform a third predetermined operation according to the acquired printer state information, after the printer enters into the printing process.

Preferably, the first predetermined operation specifically includes:

if the printer is in the Normal Printing Allowed state, distributing the printing task;

and if the acquired printer state information indicates that there is an error in the printer, distributing the printing task after a recovery of the error.

Preferably, the second predetermined operation includes:

if the printer is in a Normal Printing Not Entered state, the printer continuing to wait to enter into the printing process;

if the printer is in a Printing Entered state, processing the printing task;

and if the printer is in a Printing Forbidden state at present, resending the currently printed ticket data and/or registering the currently printed ticket as an invalid ticket.

Preferably, the third predetermined operation specifically includes:

if the printer state information indicates that there is no error in the printer during the printing process, finishing the printing;

and if it indicates that there is an error in the printer during the printing process according to the printer state information, clearing the printing buffer and setting a Printing Forbidden bit and a Printing Abnormally Completed bit of the printer real-time state flag byte.

Preferably, the printing control apparatus further includes an invalid ticket registration apparatus, adapted to register the currently printed ticket as an invalid ticket when the printer state information indicates that there is an error in the printer during the printing process.

Preferably, the printing control apparatus further includes a cutter unit, adapted to perform a cutter operation according to a cutter instruction.

Compared with the prior art, the invention provides the following advantages:

1. According to the invention, the printing process of a printer is divided into different working stages, and the state information of the printer at different working stages is acquired in real time, and a corresponding printing process control is performed according to the acquired printer state information, until the printer is in the Printing Normally Completed state, a complete and valid ticket is printed out, thereby implementing the complete and valid printing of the ticket data.

2. According to the invention, a complete and valid printing of the ticket data can be implemented, thereby ensuring the property benefit of the ticket user and avoiding the unnecessary dispute between the ticket user and the ticket distributor.

DETAILED DESCRIPTION OF THE INVENTION

Figures 1, 2A, 2B, 2C:
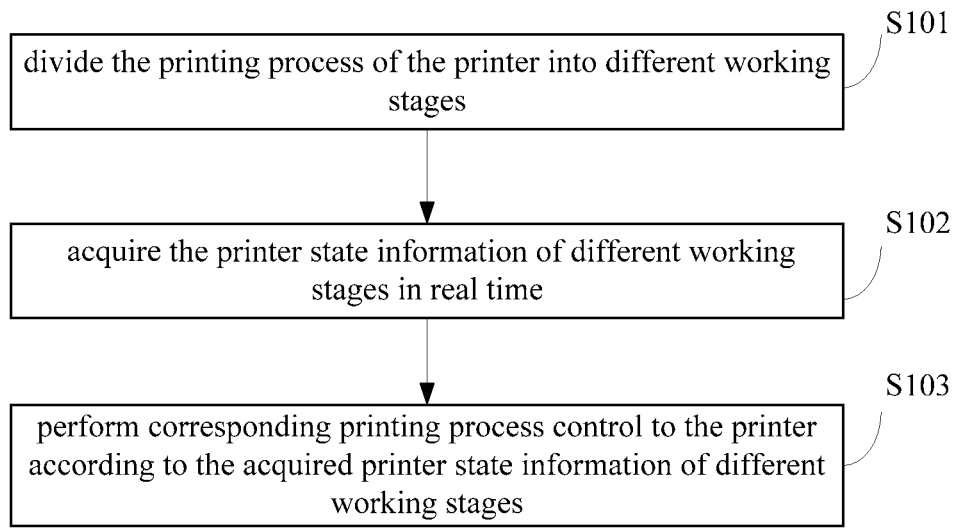
FIG. 1 is a flow chart of a printing control method provided according to the invention.
FIG. 2a, FIG. 2b and FIG. 2c are schematic structural diagrams of three bytes indicating the printer real-time state.

For a better understanding of the object, technical solution of the invention, the invention is further described in detail below with reference to the accompanying drawings and the embodiments.

According to the invention, a printing control method is provided, the basic idea of which is: after starting to transmit a printing task, the printer state is checked periodically, and the printing task is controlled according to the detection result of the printer.

The printing control method provided according to the invention includes the following steps:

Step S101: a printing process of a printer is divided into different working stages;

The printing process of the printer may be divided by using an upper machine control software in the invention.

Specifically, the printing process of the printer may be divided into the following stages: before printing, printing in progress, after printing.

Further, the printing process of the printer may be divided into before or in the progress of sending printing data to the printer by the host, before, after the printer initiating printing, or printing in progress, after printing.

Step S102: the printer state information of different working stages is acquired in real time;

A control software program runs on the upper machine, the upper machine control software being in charge of the communication with the printer, acquiring of the printer state in real time, the analyse of the printer state, setting of the printing control instruction, choosing to send a control instruction to the printer according to the state of the printer, controlling the printing action of the printer. The upper machine includes, but not limited to, various electronics device with data processing ability such as computer, notebook PC or the like.

The printer has a real-time state recording unit, which records the working state of the printer in real time, and sets the content of the real-time state flag byte of the printer according to the working state of the printer.

There are different working states in the printer, such as Printing Forbidden state, Error state, Normal Printing Allowed state, Normal Printing Not Entered state, Printing Entered state, Printing In Progress state, Printing Finished state, Printing Abnormally Completed state, Printing Normally Completed state.

The upper machine control software inquires the state of the printer with a real-time instruction before distributing data, the printer correspondingly returns the current state information once.

It should be noted that before distributing the data, the state of the printer is Error state or Normal Printing Allowed state.

The various working states of the printer are described as follows:

1. Printing Forbidden state: the printer enters into the Printing Forbidden state after an error occurs in the printer, under such state the printer performing no printing action. The printer leaves the Printing Forbidden state after receiving the Printing Forbidden state clearing instruction.

2. Error state: a state in which there is an error occurring in the printer, including various conditions, such as paper lack, upper lid opened, the printer head over-heated, the mark not found.

3. Normal Printing Allowed state: a state in which there is no error in the printer and the printer can print normally.

4. Normal Printing Not Entered state: a state in which the printer needs to continue waiting to enter a printing process.

5. Printing Entered state: a state in which the printer may continue entering into the printing process.

6. Printing In Progress state: a state in which the printer is in the process of ticket printing.

7. Printing Finished state: a state in which the printing process is completed.

8. Printing Abnormally Completed state: the printer does not normally complete the current printing, and the current page of the printing ticket data needs to be resent.

It is determined whether the printer is in the Printing Abnormally Completed state according to the printing result. For example, if such errors occur in the printing process as upper lid uplifted, paper exhausted, mark not found, the printer head over-heated, the cutter error, the printer is in the Printing Abnormally Completed state.

9. Printing Normally Completed state: it is determined that the current printing is normally completed according to the printing result, and the state of the next page of printing ticket data may be distributed.

The real-time state information of the printer may be represented by multiple byte packets and bits of the byte, different bytes and different bits of each byte correspondingly indicating various states of the printer. The upper machine control software controls the action of the printer according to these states, thereby effectively controlling the ticket printing.

The upper machine control software defines the flag byte of the real-time state, to indicate the different states and different stages of the printer. In FIG. 2a, FIG. 2b and FIG. 2c, various states of the printer are indicated respectively with three bytes. Specifically, byte 1 is used to indicate that the printer is in an Error state, and different bits in byte 1 are used to indicate different error problems. Referring to FIG. 2a, bit 1 indicates paper exhausted, bit 2 indicates upper lid uplifted, bit 3 indicates black mark not found, bit 4 indicates the printer head over-heated, bit 5 indicates the cutter error, and bit 6, bit 7 and bit 8 are unoccupied and used to define other error problems of the printer in the future. The former 4 bits of byte 2 (i.e. bit 1, bit 2, bit 3 and bit 4) in turn indicate Printing Forbidden state, Normal Printing Allowed state, Normal Printing Not Entered state, Printing Entered state. For the expansion of the printer state information definition, the remaining bits are unoccupied, referring to FIG. 2b. The former 4 bits of byte 3 (i.e. bit 1, bit 2, bit 3 and bit 4) in turn indicate Printing In Progress state, Printing Finished state, Printing Normally Completed state, Printing Abnormally Completed state, referring to FIG. 2c. For the expansion of the printer state information definition, the remaining bits are unoccupied.

The upper machine control software may inquire the real-time state flag byte of the printer by sending a real-time instruction. Each time an inquiry instruction is sent to the printer, the printer returns the state flag byte to the upper machine control software once.

Step S103: a corresponding printing process control is performed to the printer according to the acquired printer state information of different working stages.

It should be noted that when the acquired printer state information indicates that the printer is in the Printing Normally Completed state, the printed ticket is complete and valid.

In the invention, the printer may be classified into page mode printing and standard mode printing according to the working mode.

The page mode refers to: the printer stores all the printing content in the memory (assuming that a whole page of printing data is stored). In this mode, only when a print instruction sent from the upper machine control software is received, data printing is performed. In the page mode, the ticket printing process is defined as from beginning printing to completion of the printing of the current page data.

The standard mode refers to: as long as the line buffer of the printer is full (i.e. the content fulls one line of buffer) or the printer receives the printing instruction, the printer performs data printing. In standard mode, the ticket printing process is defined as from beginning printing to performing paper cut on receiving a cutter instruction.

A process of ticket data printing using the printing control method provided by the invention will be described below with respect to page mode and standard mode, respectively.

Figure 3:
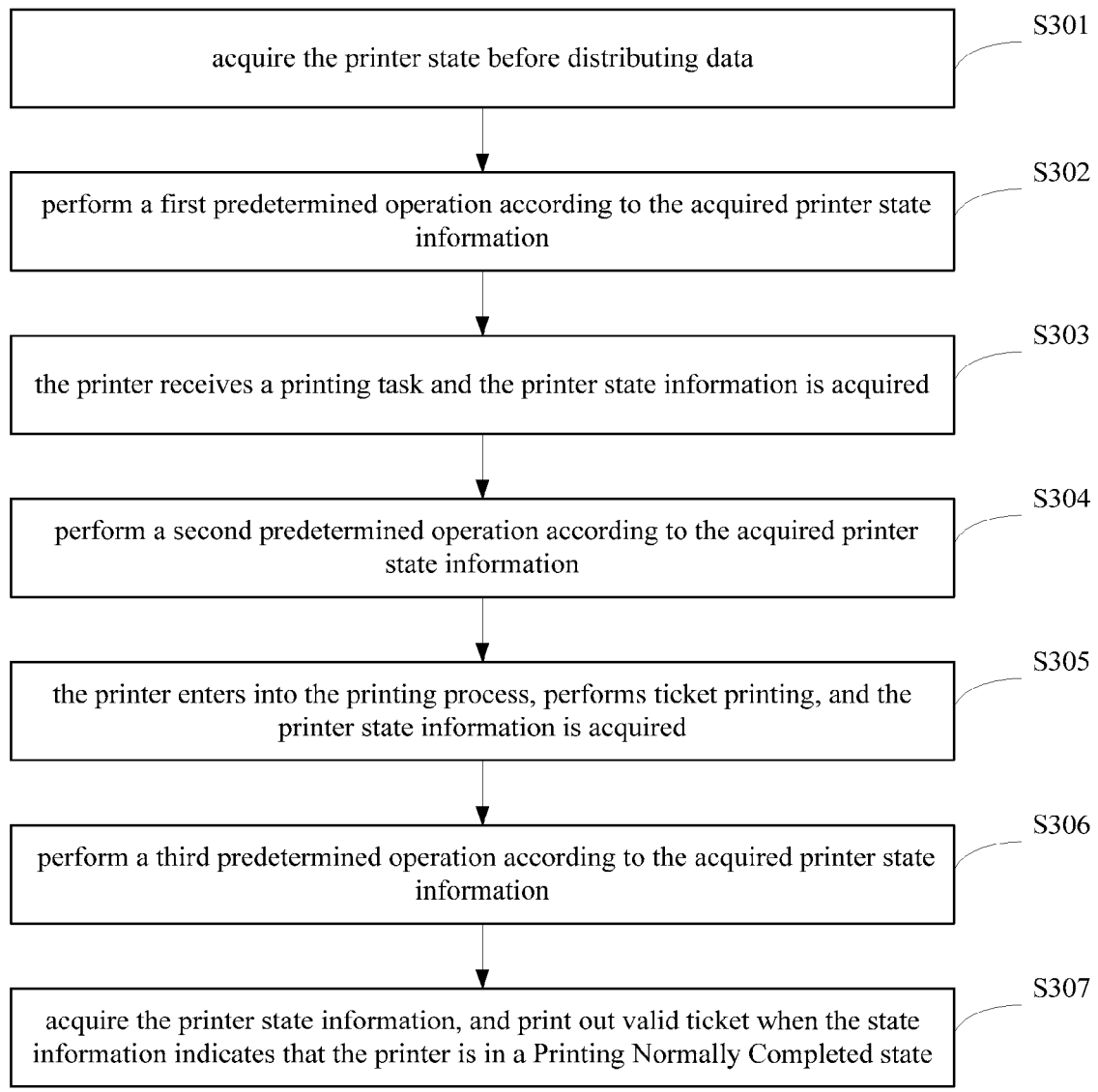
FIG. 3 is a flow chart of controlling the printer in the page mode according to the printing control method of the invention.

Referring to FIG. 3, in the page mode printing, using the printing control method provided by the invention, the implementation steps are as follows:

Step S301: the printer state is acquired before distributing data.

As described above, the printer has a real-time state recording unit, which records the working state of the printer in real time, and sets the content of the real-time state flag byte of the printer according to the working state of the printer.

Step S302: a first predetermined operation is performed according to the acquired printer state information;

Specifically, if the printer is in a Normal Printing Allowed state, the upper machine control software distributes a printing task;

otherwise, error processing is performed, and after which the printing task is distributed.

Wherein, the printer task includes setting page mode, setting page parameters, and distributing ticket data and printing instructions.

Certainly, in the standard mode, the printer task includes setting standard mode, setting page parameters and distributing ticket data and printing instructions.

Specifically, the above error processing includes: if the acquired printer state information indicates that the printer is in an Error state, after the error is recovered, an instruction is distributed to clear all bits of byte 1 and the Printing Forbidden bit of byte 2.

If the acquired printer state information indicates that the printer is not in an Error state, the Printing Forbidden bit of byte 2 is cleared. If an error occurs in the printer before the current data printing, the Printing Forbidden bit of byte 2 still exists even if the error has been cleared when distributing the current data. Therefore the Printing Forbidden bit needs to be cleared.

It could be understood that there are a lot of situations that recovers the printer to a normal state, such as reloading paper after paper exhaustion, closing the opened upper lid, etc.

Step S303: the printer receives a print task, and the state information of the printer is acquired.

A state inquiry instruction is sent to the printer using the upper machine control software, and the printer returns the current state information to the upper machine control software.

Step S304: a second predetermined operation is performed according to the acquired printer state information.

There are three cases at this time:

(1) if the printer is in the Normal Printing Not Entered state at present, it continues waiting to enter the printing process;

(2) if the printer is in the Printing Entered state, the printing task is processed.

Specifically, if there is no error, the printer is performing printing, and the printer is in the Printing Entered state.

(3) if the printer is in the Printing Forbidden state at present, the upper machine control software may resend the currently printed ticket data and register the currently printed ticket as an invalid ticket. The specific operation is as follows: if an error occurs, the printer sets the Printing Forbidden state of byte 1, and sets the Printing Abnormally Completed bit of byte 2, at this time the upper machine control software considers the currently printed ticket as an invalid ticket, and thereby can resend the currently printed ticket data and/or register the currently printed ticket as an invalid ticket.

Step S305: the printer enters into the printing process, performs the ticket printing, and the state information of the printer is acquired.

Step S306: the third predetermined operation is performed according to the acquired printer state information.

Herein, the specific predetermined operation is as follows:

(1) if it indicates that there is no error in the printer during the printing process according to the printer state information, the printing is finished. After the current ticket data printing is completed, the Printing In Progress bit of byte 3 in the printer real-time state flag byte is cleared and a Printing Finished bit is set.

(2) if it indicates that there is an error in the printer during printing process according to the printer state information, the printer performs the following operations:

Clearing the printing buffer;

Setting the Printing Forbidden bit of byte 2 in the printer real-time state flag byte, to indicate that the printer enters into the Printing Forbidden state;

Setting the Printing Abnormally Completed bit of byte 3 in the printer real-time state flag byte, to indicate that the current printing of the ticket data is abnormally completed, thereby the upper machine control software considers the currently printed ticket as an invalid ticket, hereby the currently printed ticket data may be resent and/or the currently printed ticket may be registered as an invalid ticket.

If the real-time state byte of the printer indicates that the printer is in the Printing Abnormally Completed state, the upper machine control software may register the currently printed ticket as an invalid ticket by registering the ticket number of the current ticket, and the ticket is revoked.

Step S307: the state information of the printer is acquired, and when the state information indicates that the printer is in the Printing Normally Completed state, the valid ticket is printed out.

When a Printing Normally Completed bit is set in byte 3 of the returned real-time state flag byte, and thereby the upper machine control software knows that the printer is in the Printing Normally Completed state, the printer prints out the valid ticket.

It should be noted that the upper machine control software in the above embodiment may be replaced with modules, devices with the same function.

Figure 4:
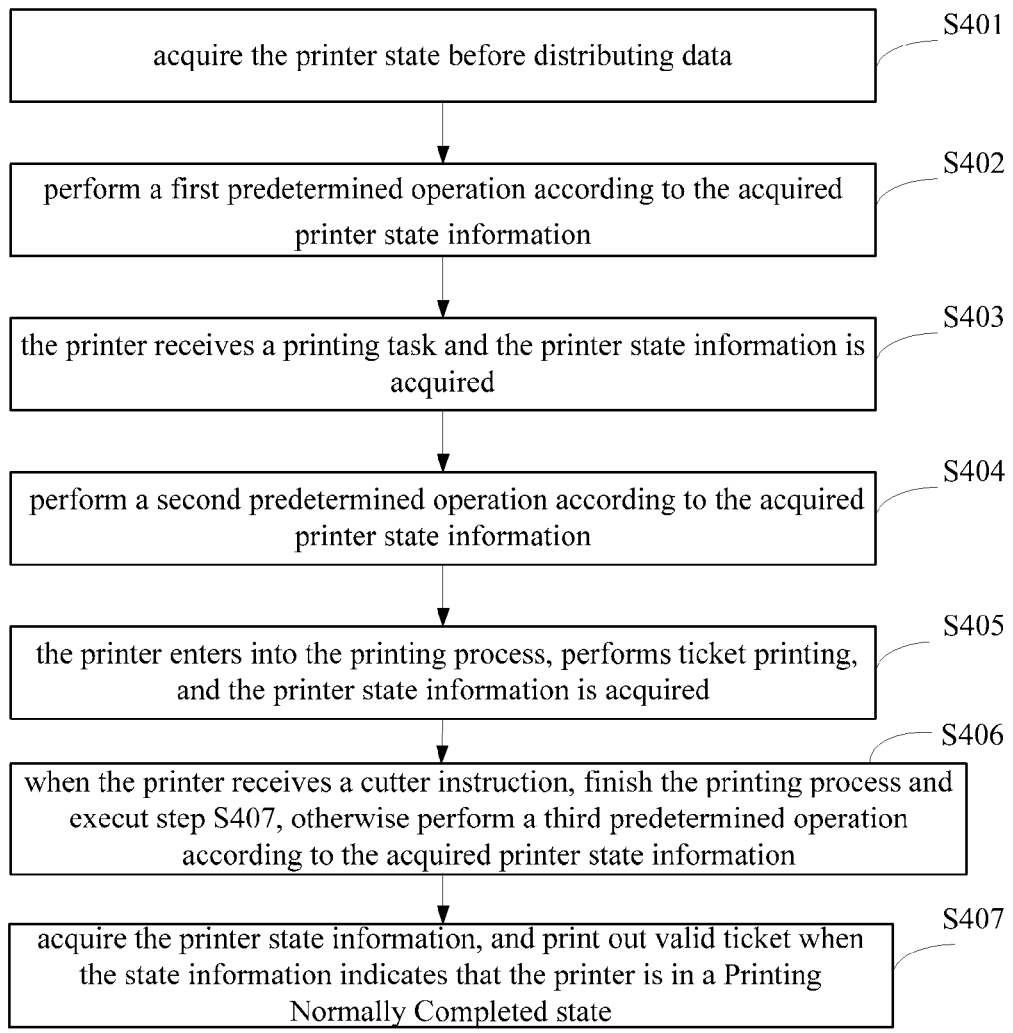
FIG. 4 is a flow chart of controlling the printer in the standard mode according to a printing control method of the invention.

Referring to FIG. 4, in the standard mode printing, by using the printing control method provided by the invention, the specific implementation steps are as follows:

It should be noted that in the standard mode, a printing process ends directly when receiving a cutter instruction, and it is determined whether the printer is in the Printing Normally Completed state and whether the printer prints out the valid ticket according to whether there is a Printing Normally Completed bit set in the returned real-time state flag byte.

Step S401: the printer state is acquired before distributing the data.

As described above, the printer has a real-time state recording unit, which records the working state of the printer in real-time, and sets the content of the real-time state flag byte of the printer according to the working state of the printer.

Step S402: a first predetermined operation is performed according to the acquired printer state information;

Specifically, if the printer is in the Normal Printing Allowed state, the upper machine control software distributes a printing task;

otherwise, error processing is performed, after which the printing task is distributed.

Wherein, the printer task includes setting standard mode, setting page parameters and distributing ticket data and printing instructions.

Specifically, the above error processing include: if the acquired printer state information indicates that the printer is in the Error state, after the error is recovered, an instruction is distributed to clear all bits of byte 1 and Printing Forbidden bit of byte 2;

If the acquired printer state information indicates that the printer is not in the Error state, the Printing Forbidden bit of byte 2 is cleared. If an error occurs in the printer before the current data printing, the Printing Forbidden bit of byte 2 still exists even if the error has been cleared when distributing the current data. Therefore the Printing Forbidden bit needs to be cleared.

It could be understood that there are a lot of situations that recovers the printer to a normal state, such as reloading paper after paper exhaustion, closing the opened upper lid, etc.

Step S403: the printer receives a print task, and the state information of the printer is acquired.

A state inquiry instruction is sent to the printer using the upper machine control software, and the printer returns the current state information to the upper machine control software.

Step S404: a second predetermined operation is performed according to the acquired printer state information.

Specifically, there are three cases at this time:

(1) if the printer is in the Normal Printing Not Entered state at present, it continues waiting to enter the printing process;

(2) if the printer is in the Printing Entered state, the printing task is processed.

Specifically, if there is no error, the printer is performing printing, and the printer is in the Printing Entered state.

(3) if the printer is in the Printing Forbidden state at present, the upper machine control software may resend the currently printed ticket data and register the currently printed ticket as an invalid ticket. The specific operation is as follows: if an error occurs, the printer sets the Printing Forbidden state of byte 1, and sets the Printing Abnormally Completed bit of byte 2, at this time the upper machine control software considers the currently printed ticket as an invalid ticket, and thereby can resend the currently printed ticket data and/or register the currently printed ticket as an invalid ticket.

Step S405: the printer enters into the printing process, performs the ticket printing, and acquires the state information of the printer.

Step S406: the printing process is finished when the printer receives the cutter instruction, and step S407 is performed, otherwise a third predetermined operation is performed according to the acquired printer state information.

Herein, the specific predetermined operation is as follows:

(1) if it indicates that there is no error in the printer during the printing process according to the printer state information, the printing is finished, and step S407 is performed.

Since the working mode of the printer is standard mode printing, as described above, in the stand mode printing, the reception of cutter instruction is considers as the end of the ticket printing process.

After the current ticket data printing is finished, the Printing In Progress bit of byte 3 in the printer real-time state flag byte is cleared and the Printing Finished bit is set.

(2) if it indicates that there is an error in the printer during printing process according to the printer state information, the printer performs the following operations:

Clearing the printing buffer;

Setting the Printing Forbidden bit of byte 2 in the printer real-time state flag byte, to indicate that the printer enters into the Printing Forbidden state;

Setting the Printing Abnormally Completed bit of byte 3 in the printer real-time state flag byte, to indicate that the current printing of the ticket data is abnormally completed, thereby the upper machine control software considers the currently printed ticket as an invalid ticket, hereby the currently printed ticket data may be resent and/or the currently printed ticket may be registered as an invalid ticket.

If the real-time state byte of the printer indicates that the printer is in the Printing Abnormally Completed state, the upper machine control software may make the ticket be invalid by registering the ticket number of the current ticket.

Step S407: the state information of the printer is acquired, and when the state information indicates that the printer is in the Printing Normally Completed state, the valid ticket is printed out.

When a Printing Normally Completed bit is set in byte 3 of the returned real-time state flag byte, and thereby the upper machine control software knows that the printer is in the Printing Normally Completed state, the printer prints out the valid ticket.

It should be noted that the upper machine control software in the above embodiment may be replaced with modules, devices with the same function as the upper machine control software.

It can be seen from the above that in the printing control method provided by the invention, the printing process of a printer is divided into different working stages, the state information of the printer at different working stages is acquired in real-time, and a corresponding print process control is performed according to the acquired printer state information, until the printer is in the Printing Normally Completed state, and a complete and valid ticket is printed out, thereby implementing the valid printing of the ticket data, ensuring the completion of the printing task of the ticket data.

Figure 5:
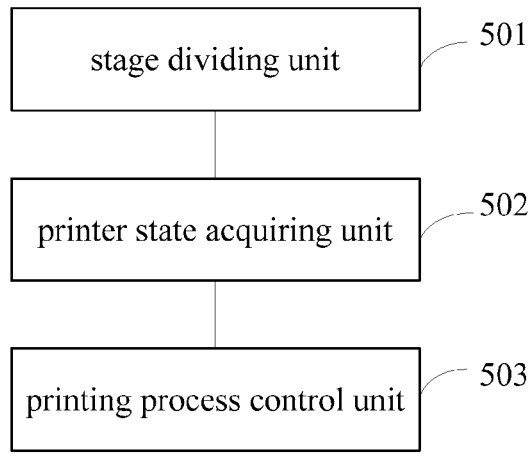
FIG. 5 is a schematic structural diagram of a printing control apparatus provided according to the invention.

Based on the printing control method provided by the invention, there is further provided a printing control apparatus in the invention. Referring to FIG. 5, the printing control apparatus includes a stage dividing unit 501, a printer state acquiring unit 502 and a printing process control unit 503, in which, the stage dividing unit 501 is adapted to divide the printing process of the printer into different working stages;

the printer state acquiring unit 502 is adapted to acquire the printer state information of different working stages in real-time;

the printing process control unit 503 is adapted to perform corresponding printing process control according to the printer state information of different working stages acquired by the printer state acquiring unit.

In the invention, the printing process control unit 503 includes a first predetermined operation execution unit, a second predetermined operation execution unit and a third predetermined operation execution unit;

the first predetermined operation execution unit is adapted to execute the first predetermined operation according to the acquired printer state information before sending printing data;

the second predetermined operation execution unit is adapted to execute the second predetermined operation according to the acquired printer state information, after the printer receives a printing task;

the third predetermined operation execution unit is adapted to execute the third predetermined operation according to the acquired printer state information, after the printer enters into the printing process.

Specifically, the above mentioned first predetermined operation includes: if the printer is in the Normal Printing Allowed state, the printing task is distributed; and if the acquired printer state information indicates that there is an error in the printer, the printing task is distributed after recovery of the error.

Specifically, the above mentioned second predetermined operation includes: if the printer is in the Normal Printing Not Entered state, the printer continues waiting to enter into the printing process; if the printer is in the Printing Entered state, the printing task is processed; and if the printer is in the Printing Forbidden state at present, the currently printed ticket data is resent and/or is registered as invalid ticket.

Specifically, the above mentioned third predetermined operation includes: if the printer state information indicates that there is no error in the printer during printing process, the printing is finished; and if it indicates that there is an error in the printer during the printing process according to the printer state information, the printing buffer is cleared, and the Printing Forbidden bit and the Printing Abnormally Completed bit of the printer real-time state flag byte are set.

The printing control apparatus provided in the invention also includes an invalid ticket registration apparatus, which is adapted to register the currently printed ticket as an invalid ticket when the printer state information indicates that there is an error in the printer during printing process.

The printing control apparatus provided in the invention may also include a cutter unit, which is adapted to perform a cutter operation according to the cutter instruction.

The preferred embodiments of the invention have been described above. It should be noted that for those ordinarily skilled in the art several improvements and modifications may be made without departing the principle of the invention, which should also be deemed as the scope of protection of the invention.

What is claimed is:

1. A printing control method, comprising:
   dividing a printing process of a printer into different working stages;
   acquiring printer state information of the different working stages in real time;
   performing a corresponding printing process control according to the acquired printer state information of different working stages;
   wherein, performing the corresponding printing process control comprises:
   performing a first predetermined operation according to the acquired printer state information before sending printing data;
   performing a second predetermined operation according to the acquired printer state information after the printer receives a printing task;
   performing a third predetermined operation according to the acquired printer state information after the printer enters into the printing process;

wherein, the second predetermined operation specifically comprises:

if the printer is in a Normal Printing Not Entered state, the printer continuing waiting to enter into the printing process;

if the printer is in a Printing Entered state, processing the printing task; and if the printer is in a Printing Forbidden state, resending currently printed ticket data to the printer and/or registering a currently printed ticket as an invalid ticket.

2. The method according to claim 1, wherein the first predetermined operation specifically comprises:

if the printer is in a Normal Printer Allowed state, distributing the printing task;

and if the acquired printer state information indicates that there is an error in the printer, distributing the printing task after a recovery of the error.

3. The method according to claim 1, wherein the third predetermined operation specifically comprises:

if the printer state information indicates that there is no error in the printer during the printing process, finishing the printing;

and if it indicates that there is an error in the printer during the printing process according to the printer state information, clearing a printing buffer and setting a Printing Forbidden bit and a Printing Abnormally Completed bit of a printer real-time state flag byte.

4. The method according to claim 3, further comprising: if it indicates that there is an error in the printer during the printing process according to the printer state information, registering the currently printed ticket as an invalid ticket.

5. The method according to claim 1, further comprising receiving a cutter instruction and finishing the printing task.

6. The method according to claim 1, wherein when the acquired printer state information indicates that the printer is in a Printing Normally Completed state, the printed ticket is complete and valid.

7. A printing control apparatus, comprising a stage dividing unit, a printer state acquiring unit and a printing process control unit, wherein, the stage dividing unit is adapted to divide a printing process of a printer into different working stages;

the printer state acquiring unit is adapted to acquire the printer state information of the different working stages in real time;

the printing process control unit is adapted to perform a corresponding printing process control according to the printer state information of the different working stages acquired by the printer state acquiring unit;

wherein the printing process control unit comprises:

a first predetermined operation execution unit, adapted to perform a first predetermined operation according to the acquired printer state information before sending the printing data;

a second predetermined operation execution unit, adapted to perform a second predetermined operation according to the acquired printer state information, after the printer receives a printing task; and a third predetermined operation execution unit, adapted to perform a third predetermined operation according to the acquired printer state information, after the printer enters into the printing process;

wherein, the second predetermined operation comprises:

if the printer is in a Normal Printing Not Entered state, the printer continuing to wait to enter into the printing process;

if the printer is in a Printing Entered state, processing the printing task; and if the printer is in a Printing Forbidden state, resends currently printed ticket data to the printer and/or registers a currently printed ticket as an invalid ticket.

8. The apparatus according to claim 7, wherein the first predetermined operation specifically comprises:

if the printer is in a Normal Printing Allowed state, distributing the printing task;

and if the acquired printer state information indicates that there is an error in the printer, distributing the printing task after a recovery of the error.

9. The apparatus according to claim 7, wherein the third predetermined operation specifically comprises:

if the printer state information indicates that there is no error in the printer during the printing process, finishing the printing;

and if it indicates that there is an error in the printer during the printing process according to the printer state information, clearing the printing buffer and setting a Printing Forbidden bit and a Printing Abnormally Completed bit of the printer real-time state flag byte.

10. The apparatus according to claim 9, further comprising an invalid ticket registration apparatus, adapted to register the currently printed ticket as an invalid ticket when the printer state information indicates that there is an error in the printer during the printing process.

11. The apparatus according to claim 7, further comprising a cutter unit, adapted to perform a cutter operation according to a cutter instruction.

* * * * *